United States Patent [19]

Statz et al.

[11] Patent Number: 5,501,736
[45] Date of Patent: Mar. 26, 1996

[54] CONVEYOR FOR TRANSPORTING PARTS IN A PAINT BOOTH AND DRYING AND CURING APPARATUS

[75] Inventors: Charles Statz; Thomas Strandberg, both of Wausau, Wis.

[73] Assignee: Harley-Davidson Motor Company, Milwaukee, Wis.

[21] Appl. No.: 306,030

[22] Filed: Sep. 14, 1994

[51] Int. Cl.[6] .................................................. B05C 13/00
[52] U.S. Cl. .......................... 118/500; 118/630; 118/324; 198/377; 198/800; 269/17
[58] Field of Search ..................................... 118/324, 500, 118/239, 630; 198/377, 800; 248/653, 664; 269/17, 69

[56] References Cited

U.S. PATENT DOCUMENTS

| | | | |
|---|---|---|---|
| 1,389,887 | 9/1921 | Leyland et al. | 198/800 |
| 1,864,451 | 6/1932 | Lungen . | |
| 2,964,894 | 12/1960 | Culver | 53/257 |
| 3,010,564 | 11/1961 | Drew | 198/800 |
| 3,245,270 | 4/1966 | Smith | 74/20 |
| 4,180,152 | 12/1979 | Sefcik | 198/377 |
| 4,474,519 | 10/1984 | Khirwadkar | 414/12 |
| 4,501,352 | 2/1985 | Vanagisawa et al. | 198/775 |
| 4,721,432 | 1/1988 | Cargill | 414/749 |
| 4,988,261 | 1/1991 | Blatt | 414/749 |
| 5,013,203 | 5/1991 | Wakabayashi | 414/222 |
| 5,094,183 | 3/1992 | Hamasaki | 118/500 |
| 5,261,520 | 11/1993 | Duke | 198/377 |
| 5,297,915 | 3/1994 | Bach | 269/17 |

*Primary Examiner*—Laura Collins
*Attorney, Agent, or Firm*—Michael, Best & Friedrich

[57] ABSTRACT

A conveyer for transporting a part to be painted through a paint booth and drying and curing apparatus. The conveyer includes a transporter having an upwardly extending post, a tubular lifter disposed on the post and having a contoured lower surface which engages a pin on the post for supporting the lifter at a first elevation on the post when the lifter is in a first angular position and at a second lower elevation when the lifter is at a second higher elevation on the post. A fixture includes a pipe telescopically received on the post and having a lower end rotatably supported on the lifter when the lifter is in its first angular position and being lowered into engagement with a stop pin on the post when the lifter is in its second angular position. The fixture includes a support at the upper end of the pipe for supporting the part to be painted. The transporter is mounted on a track system which retains the post generally vertical regardless of inclines and declines in the track system so that the angular orientation of the part remains unchanged as the part is conveyed through the paint booth, dryer and curing apparatus.

6 Claims, 3 Drawing Sheets

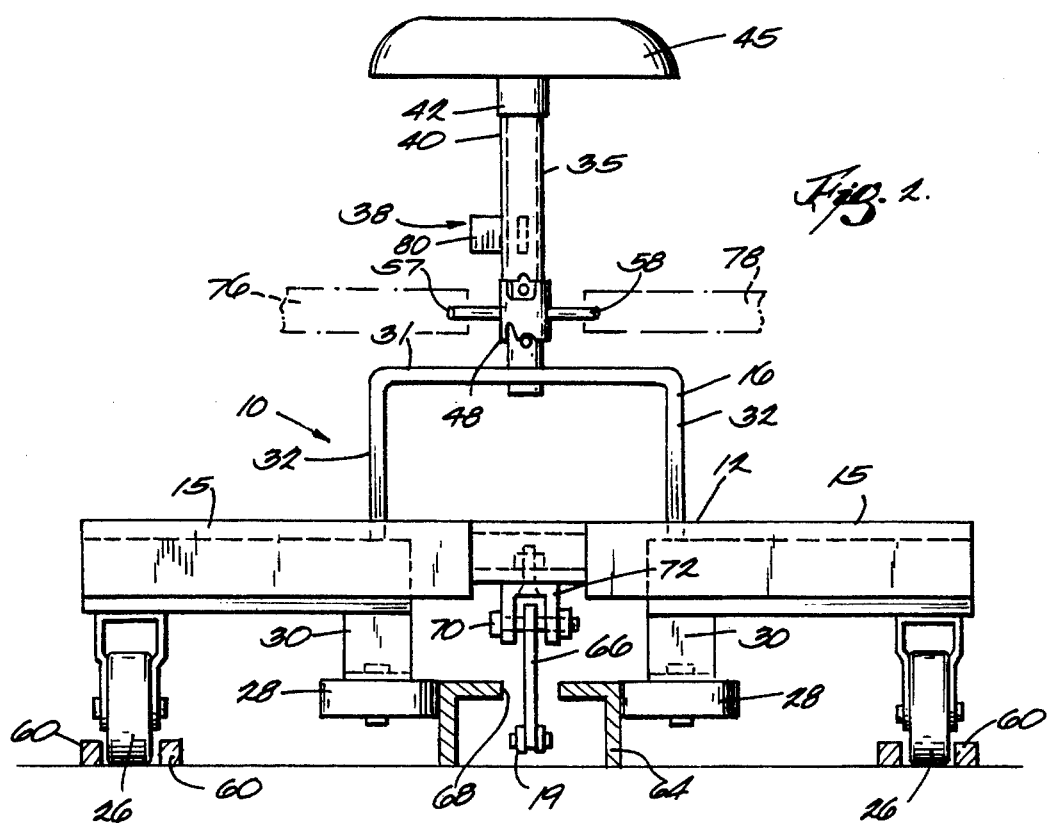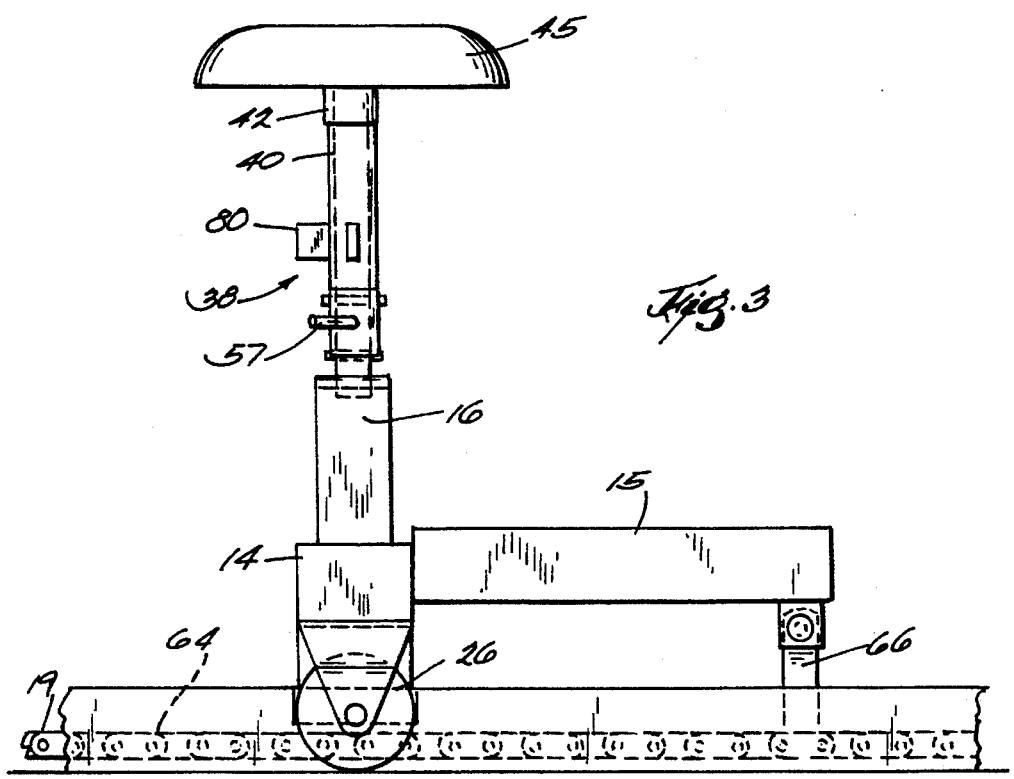

5,501,736

CONVEYOR FOR TRANSPORTING PARTS IN A PAINT BOOTH AND DRYING AND CURING APPARATUS

BACKGROUND OF THE INVENTION

This invention relates to conveyers and more particularly to conveyers for transporting a part to be painted through a paint booth and drying and curing apparatus.

Conventional conveyers for transporting parts to be painted, such as motorcycle fenders, motorcycle gas tanks, sidecars and the like, consist of an overhead chain having fixtures from which the parts to be painted are hung. As the parts are transported through the paint booth, any necessary turning of the part was accomplished manually. Such manual handling of the parts themselves required that the painted surfaces be retouched. An additional problem with prior art systems is the tendency for the parts to fall off the conveyor during grade changes.

SUMMARY OF THE INVENTION

It is an object of the invention to provide a new and improved conveyer for transporting parts to paint through a paint booth and curing and drying apparatus.

Another object of the invention is to provide a conveyer for parts to be painted which allows the part to be freely rotated.

A further object of the invention is to provide a conveyer for parts to be painted which permits the orientation of the part to remain constant as the elevation of the conveyer changes.

Still another object of the invention is to provide a conveyor for parts to be painted which permits free rotation of the part in the paint booth but which locks the part in the necessary orientation for curing.

These and other objects and advantages of the present invention will become more apparent from the detailed description thereof taken with the accompanying drawings.

In general terms, the invention comprises a conveyer for transporting a part to be painted through a paint booth and drying and curing apparatus. The conveyer includes a transporter having an upwardly extending elongate member, lifting means longitudinally movable on the elongate member between a first elevated position and a second lower position, support means on the member for supporting the lifting means in each of its positions, part support means mounted on the elongate member for rotation when in a first elevated position on the elongate member and being locked against rotation when in a second lower position on the elongate member, the lifting means engaging the part support means in its first position for supporting the part support means in its elevated position and for lowering the part support means into its second lower position when the lifting means is in its second angular position.

BRIEF DESCRIPTION OF THE DRAWINGS

FIG. 2 is a front elevation view thereof;

FIG. 3 is a side elevation view thereof;

DETAILED DESCRIPTION OF THE PREFERRED EMBODIMENT

Figure 1:
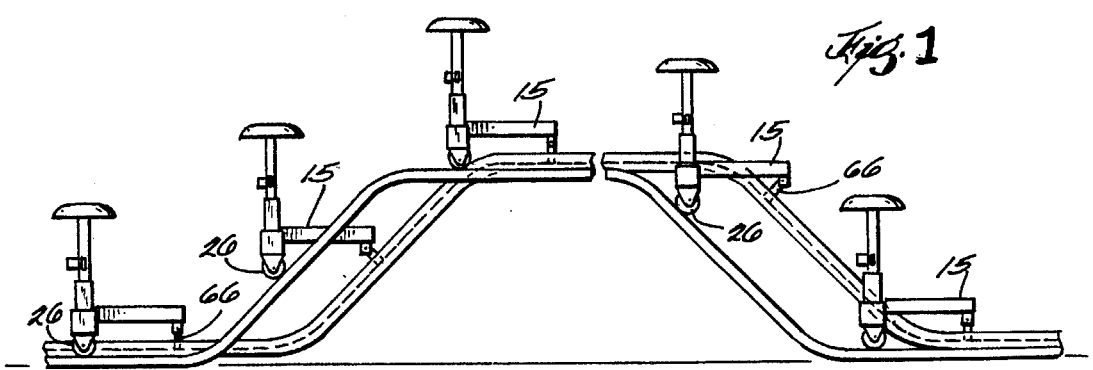
FIG. 1 is a perspective view of the conveyor assembly according to the preferred embodiment of the invention.

The preferred embodiment of the invention is shown in FIGS. 1–3 to comprise a conveyer consisting of a transporter 10 mounted on a track assembly 11 for moving a part to be painted through a paint booth (not shown) and paint curing and drying apparatus (not shown). The transporter 10 includes a frame 13 consisting of a pair of rear members 14, a pair of inwardly extending side members 15 and a connecting bridge 16 between side members 15. At the forward end of the frame 13 and between side members 15, there is a coupling support 18 adapted to be coupled to an elongate conveyer chain 19 which forms part of the track assembly 11.

A pair of casters 26 are mounted at the outer ends of each rear member 14 and a pair of bumper blocks 28 are mounted horizontally below the inner ends of rear members 14 on downwardly extended vertical supports 30. The bumpers 28 are preferably fabricated from nylon or a similar low friction material.

The bridge 16 includes a top portion 31 and a pair of downwardly extending legs 32 fixed at their upper ends to the top portion 31 and at their lower ends to the upper surfaces of the rear members 14. A shaft 35 is fixed to and extends vertically upwardly from the top portion 31.

A part support assembly 38 is mounted on the shaft 35 and includes a pipe 40 which is telescopically received on the shaft 35 and a fixture 42 for supporting the part 45 to be painted. The lower end of part support assembly 38 engages a lifter 48.

Figure 4:
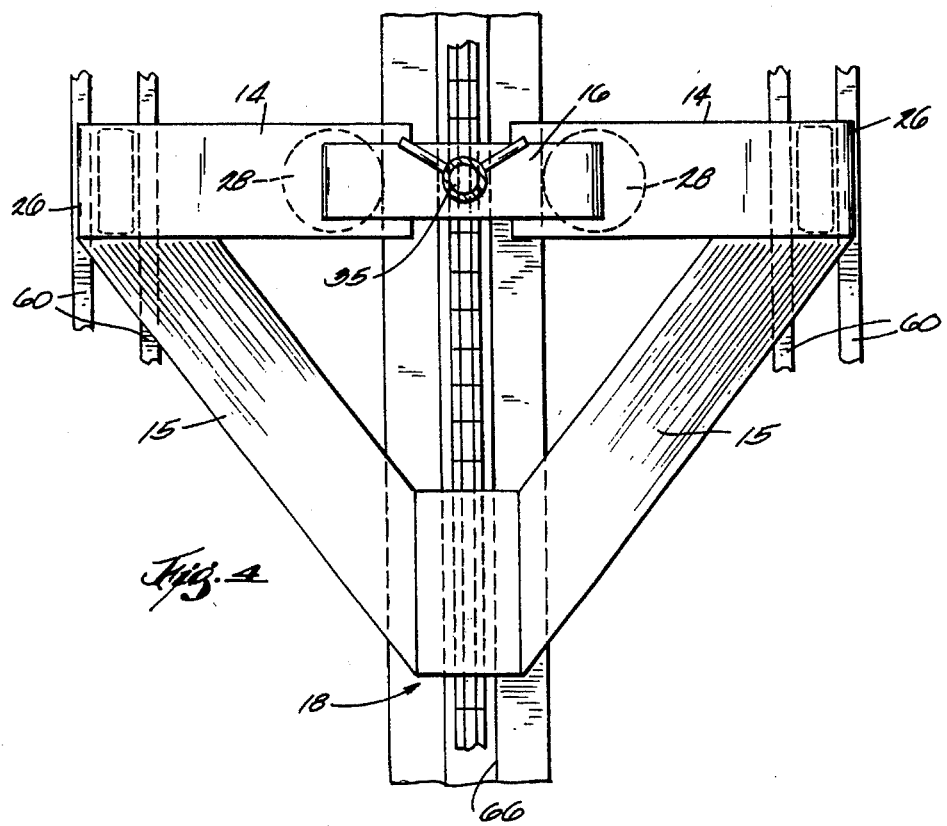
FIG. 4 is a top plan view thereof.
Figure 5:
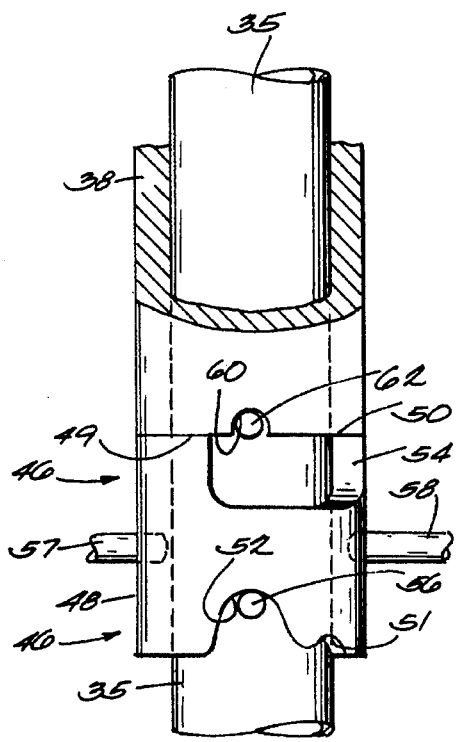

The lifter 48 is shown in greater detail in FIGS. 4 and 5 to comprise a short tubular member pivotally mounted on and telescopically received on the shaft 35 and having an inner diameter slightly larger than the outer diameter of the shaft 35. The outer diameter of tubular member 48 is equal to the outer diameter of the pipe 40. The lower edge 49 of pipe 40 rests on the upper edge 50 of tubular member 48. The lower edge of tubular member 48 is contained to define a shallow notch 51 and a deeper notch 52. In addition, there is a wide notch 54 formed in the upper edge 50 of member 48. A first pin 56 extends radially from the shaft 35 and is engaged by one of the notches 51 or 52 as will be explained more fully below. In addition, a similar contour is formed in the opposite side of the tubular member 48 and a second pin (not shown) extends from the opposite side of shaft 35. The contour on the opposite side of member 48 is a mirror image of that on the near side so that both the shallow notches 51 and the deeper notches 52 are diagonally aligned. A pair of arms 57 and 58 extend radially from the member 48 and spaced apart by a radial angle of about 120°.

The lower edge 49 of the pipe 40 is an annulus except for a notch 60. There is also a third pin 62 extending radially from the shaft 35 and generally above the pin 56.

Figure 7:
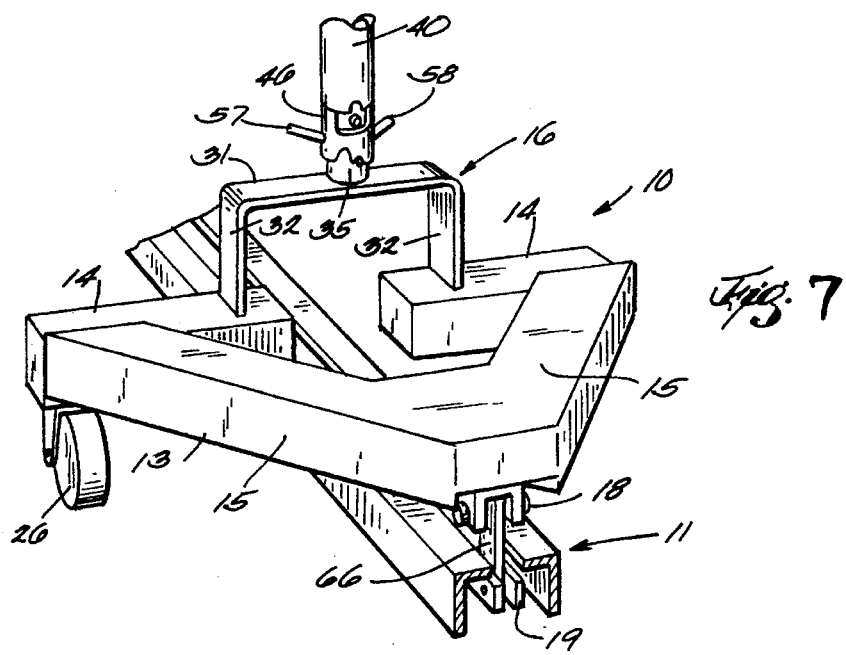
FIG. 7 is a side elevation view schematically illustrating the operation of the conveyor shown in FIG. 1.

In addition to the conveyor chain 19, the track assembly 11 also has pairs of side rails 61 which are employed at inclines and declines as shown in FIG. 7 for receiving the wheels of the casters 26 therebetween. In addition, the conveyer chain 19 is disposed in a chain housing 64. A plurality of dogs 66 are fixed to the chain 62 in a spaced apart relation and each extends upwardly through a longitudinal gap 68 in the chain housing 64. Each of the dogs 66 are secured by a bolt 70 to a coupling 72 fixed below the coupling support 18 on each of the transporters 10.

In order to maintain the orientation of the part 45 being painted as the transporter 10 moves horizontally, each change in grade of the tracks 60 must be compensated by a delayed grade change in the chain 19 as shown in FIG. 7. In this manner, the coupling support 18 always remains at the same relative elevation as the rear members 14 even though they are spaced about horizontally in the direction of movement. As a result, the orientation of the part 45 remains unchanged as the transporter moves up inclines and declines while traveling through the paint booth and drying and curing equipment.

Figure 6:
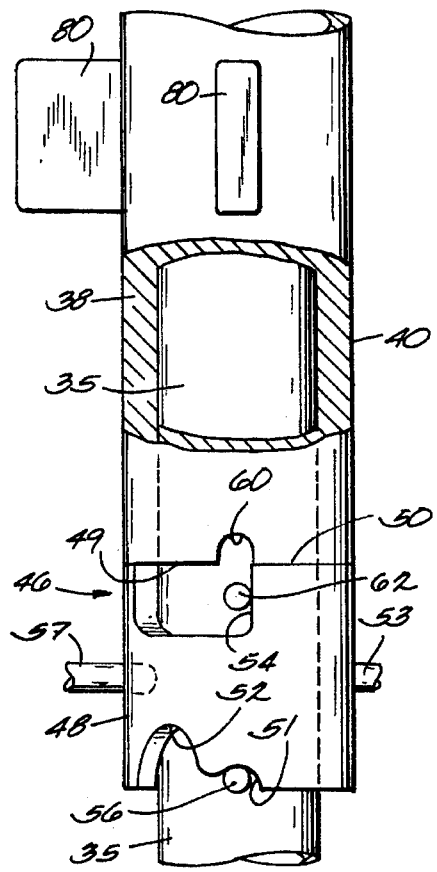
FIGS. 5 and 6 are fragmentary views of a portion of a conveyor shown in FIG. 1 and illustrating the operation thereof.

In operation, it is desired that the part 45 be freely rotatable as it moves through the paint booth (not shown) but that it be fixed as it moves through the drying and curing apparatus (not shown). Toward this end, a first arm 76, as shown in FIG. 2, is mounted on a support (not shown) disposed adjacent track assembly 11 at a point preceding the paint booth. The arm 76 is positioned to be engaged by the arm 57 extending from the tubular member 48. This rotates the tubular member 48 from its position in FIG. 5, where the deep notch 52 engages the pin 56, to its position shown in FIG. 6 where the shallow notch 51 engages the pin 56. As a result, the member 48 moves upwardly on shaft 35 to elevate pipe 40 so that the notch 60 in its lower edge is above the pin 62. Also, as the tubular member 48 rotates, the trailing edge of the notch 54 engages the pin 62 to prevent overtravel. The fixture 38 and the part 45 are thereby free to rotate.

As the transporter 15 exits the paint booth and moves into the curing and drying apparatus, the arm 58 extending from member 48 engages a second arm 78 positioned adjacent track assembly 11. This rotates the member 48 toward the right as viewed in FIG. 6 and from its position shown in FIG. 6, where the shallow notch 51 engages the pin 56, to its position shown in FIG. 5 where the deep notch 52 engages pin 56. The member 48 and the pipe 40 are thereby lowered so that the notch 60 in the lower end of pipe 40 is positioned to engage the pin 62 extending from shaft 35 whereby the part support fixture 38 is prevented from rotating as the transporter 10 moves the part 45 through the curing and drying apparatus. This locks the part 45 in a predetermined position to allow for the required clearance in the oven and to orient the part for proper curing. Tabs 80 extending from the pipe 40 and spaced at a rotational angle of about 90° are provided to facilitate the positioning of the notch 60 over pin 62 before the member 48 is rotated.

While only a single embodiment of the invention has been illustrated and described, it is not intended to be limited thereby but only by the scope of the impending claims.

We claim:

1. A conveyer for transporting a part to be painted through a paint booth and drying and curing apparatus, the conveyer comprising a transporter having an upwardly extending elongate member, selectively operable lifting means longitudinally movable on the elongate member between a first angular position and a second angular position, support means on said elongate member for supporting said lifting means in each of its angular positions, part support means mounted on said elongate member for rotation and engaging said lifting means and being rotatable on said elongate member when said lifting means is in its first angular position on said elongate member and being locked against rotation when said lifting means is in its second angular position on said elongate member.

2. The conveyer set forth in claim 1 wherein said lifting means comprises a tubular member pivotally mounted on said elongate member and having an upper surface, said part support means comprising an elongate support member mounted on said elongate member, first locking means mounted on the elongate member and second locking means mounted on said part support means, said first locking member being engageable with said second locking member when said lifting means is in its second angular position and said first locking means being disengaged from said second locking means when said lifting means is in its second angular position.

3. A conveyor for transporting a part to be painted through a paint booth and drying and curing apparatus, the conveyor comprising a transporter for transporting the part, displacing means coupled to said transporter for moving said transporter, a vertically extending member mounted on the transporter, part support means for supporting the part to be painted, said part support means being mounted on said vertically extending member for rotation relative to the transporter, locking means mounted on said vertically extending member for locking said part support means against rotation, and selectively operable means pivotally mounted on said vertically extending member for movement between first and second angular positions and being selectively engageable with said part support means and for moving said part support means between first and second positions on said vertically extending member, said locking means being operable to prevent rotation of said part support means when said part support means is in its second position, said selectively operable means being operable to support said part support means for rotation when in its first angular position and for moving said part support means into engagement with said locking means when in its second angular position.

4. The conveyor set forth in claim 3 wherein said selectively operable means comprises a tubular member pivotally mounted on said vertically extending member, means on said vertically extending member for lowering said tubular member as said tubular member pivots from its first to its second angular position, said locking means being disposed on said vertically extending member and positioned to be engaged by said part support means when said tubular member is lowered.

5. A conveyer for transporting a part to be painted through a paint booth and drying and curing apparatus, the conveyer comprising a transporter for transporting the part, displacing means coupled to said transporter for moving said transporter, a support mounted on said transporter, part support means for supporting the part to be painted, said part support means being mounted on said support for rotation relative to the transporter when said part support means is in a first position, locking means mounted on said support for locking said part support means against rotation when said part support means is in a second position, and selectively operable means mounted on said support for movement between first and second angular positions and being selectively engageable with said part support means and for moving said part support means between first and second positions on said support, said selectively operable means being operable to move said part support means to its first position for rotation when said selectively operable means is moved to its first angular position and for moving said part support means to its second position when said selectively operable means is moved to its second angular position.

6. The conveyor set forth in claim 5 wherein said selectively operable means is pivotally mounted on said support and operative for lowering said part support means into engagement with said locking means as said selectively operable means pivots from its first to its second angular position and for elevating said part support means out of engagement with said locking means as said selectively operable means pivots from its second angular position to its first angular position.

* * * * *